United States Patent [19]

Fukuhara

[11] 4,302,089
[45] Nov. 24, 1981

[54] REFLECTING MIRROR DEVICE IN A SINGLE LENS REFLEX CAMERA

[75] Inventor: Toru Fukuhara, Isehara, Japan

[73] Assignee: Nippon Kogaku K.K., Tokyo, Japan

[21] Appl. No.: 84,747

[22] Filed: Oct. 15, 1979

[51] Int. Cl.³ .............................................. G03B 19/12
[52] U.S. Cl. .................... 354/152; 350/172; 354/201
[58] Field of Search .................. 354/55, 56, 59, 152, 354/155, 199, 200, 201, 224, 225; 350/171, 172, 130, 132, 145, 288; 352/205, 206

[56] References Cited

U.S. PATENT DOCUMENTS

| | | | |
|---|---|---|---|
| 2,043,292 | 6/1936 | Hillman | 350/172 |
| 3,332,330 | 7/1967 | Broschke et al. | |
| 4,081,807 | 3/1978 | Urano et al. | 354/201 X |

FOREIGN PATENT DOCUMENTS 50-37801 11/1975 Japan .

*Primary Examiner*—John Gonzales
*Attorney, Agent, or Firm*—Fitzpatrick, Cella, Harper & Scinto

[57] ABSTRACT

This specification discloses a reflecting mirror device in a single lens reflex camera for receiving light passed through the picture-taking lens of the camera during finder observation, the reflecting mirror device reflecting said light and directing it to a finder optical system, while, at the same time, passing therethrough part of said light and directing it to the light-receiving portion of a metering system. The reflecting mirror device has a number of pin-holes irregularly arranged on the reflecting surface thereof.

7 Claims, 5 Drawing Figures

REFLECTING MIRROR DEVICE IN A SINGLE LENS REFLEX CAMERA

BACKGROUND OF THE INVENTION

1. Field of the Invention

This invention relates to a reflecting mirror device in a single lens reflex camera for splitting incident light from the picture-taking lens of the camera into two light beams during finder observation and for directing one light beam to a finder optical system by reflection and directing the other light beam to a metering system such as a light-receiving element by transmission.

2. Description of the Prior Art

There is known a device in which a metallic translucent film is provided on a reflecting mirror as by vaporization so that picture-taking light is split into two light beam by the translucent film. This device has suffered from a disadvantage resulting from the use of a translucent film, namely, a disadvantage that the finder image becomes colored, or the finder image becomes dark due to the absorption of light by the translucent film, or the light passed through the translucent film to the light-receiving element is decreased in quantity to reduce the metering performance. To overcome such disadvantage, there has been proposed a device in which a number of light-transmitting slits, instead of a translucent film, is provided on a reflecting mirror so that the light passed through such slits is directed to the light-receiving element while the light reflected by the reflecting surface is directed to the finder optical system. Although this device is improved in metering performance, it still suffers from a disadvantage that the width and length of each individual slit are so great that the shadows of such slit are projected on the finder image to make the finder image difficult to view as in the aforementioned conventional device.

SUMMARY OF THE INVENTION

It is an object of the present invention to provide a reflecting mirror device which enables obtainment of a finder image which is easy to view and in which the light can pass through the reflecting mirror without being absorbed so that the metering performance may be improved.

It is a further object of the present invention to provide a reflecting mirror device which also enables the output characteristic of the metering system with respect to the aperture of the picture-taking lens to be improved.

The invention will become fully apparent from the following detailed description thereof taken in conjunction with the accompanying drawings.

DESCRIPTION OF THE PREFERRED EMBODIMENTS

Figure 1:
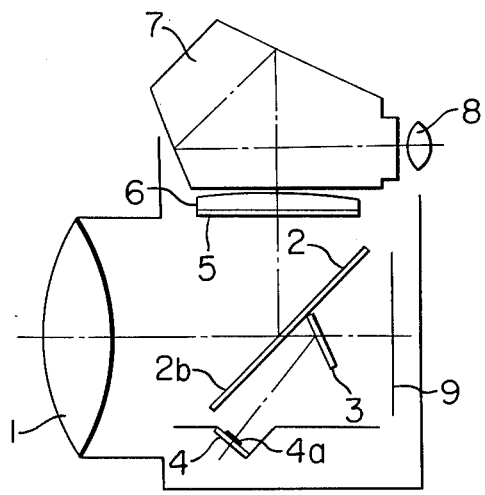
FIGS. 1 and 2 show an embodiment of the present invention, FIG. 1 being a schematic cross-sectional view of a single lens reflex camera illustrating the relation between a reflecting mirror and other elements, and FIG. 2 being a front view illustrating the construction of the reflecting mirror.
Figure 2:
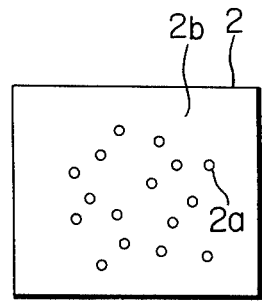

FIG. 1, which shows an embodiment of the present invention, is a schematic cross-sectional view of a single lens reflex camera illustrating the relation between a reflecting mirror and other various elements. FIG. 2 is a front view of the reflecting mirror illustrating the construction thereof. Designated by 1 in FIG. 1 is a picture-taking lens, and denoted by 2 is a reflecting mirror which will hereinafter be described. The reflecting mirror 2 is at the shown position during the finder observation and splits the light incident through the picture-taking lens 1 into two light beams, one of which is reflected by the mirror 2 and the other light beam is passed through the mirror 2. A metering small mirror 3 is disposed rearwardly of the reflecting mirror to direct said other light beam passed through the reflecting mirror 2 to the light-receiving surface 4a of a light-receiving element 4. A finder image may be formed on the surface of a finder screen 5 by said one light beam reflected by the reflecting mirror 2. This finder image may emerge from an eyepiece 8 having passed through a condenser lens 6 and a prism 7 and may be observed. The reflecting mirror 2 and the metering small mirror 3 jump upwardly at shutter release and retract out of the picture-taking light path to permit the picture-taking light to be directed to a film surface 9. The reflecting mirror will now be described in detail by reference to FIG. 2. The reflecting mirror 2 has a reflecting surface 2b formed with a number of pin-holes 2a in the front surface thereof, and most of the light incident from the picture-taking lens is reflected by this reflecting surface 2b while part of the light incident from the picture-taking lens passes through the pin-holes 2a. These pin-holes 2a are of a minute size and disposed irregularly. That is, the size of the pin-holes 2a satisfies two conditions: (1) that the pin-holes are minute to such an extent that the shadows of the pin-holes 2a cannot be recognized on the finder screen 5 even when light rays parallel to the optic axis of the picture-taking lens are increased in number by stopping down the aperture of the picture-taking lens or by using a long-focus lens, and (2) that the pin-holes are large enough so that the phenomenon of light diffraction created by the multiple pin-holes formed on the reflecting surface 2b cannot be recognized as a flare in the finder image; and the pin-holes are provided irregularly to minimize the phenomenon of diffraction created by the multiple pin-holes. By so forming the pin-holes 2a, the shadows of the pin-holes 2a formed on the finder screen 5 can be eliminated to such an extent that they can be practically neglected, and the occurrence of the flare created by the phenomenon of diffraction can be reduced to such an extent that it can be practically neglected. Specifically, by determining the cross-sectional area of each pin-hole 2a to the order of $8 \times 10^{-5}$ mm$^2$ to $8 \times 10^{-3}$ mm$^2$, for example, determining the diameter of each pin-hole 2a to several hundredths of one millimeter if the cross-section of the pin-hole 2a is circular, it is possible to obtain a finder image in which the influence of shadows and diffraction is practically eliminated. Where the pin-holes are formed with such numerical value, little or no influence of shadows or diffraction is recognized even if the light rays parallel to the optic axis of the picture-taking lens are increased in number (for example, if the aperture diameter of the picture-taking lens is made small or if a long-focus lens is employed).

Figure 3:
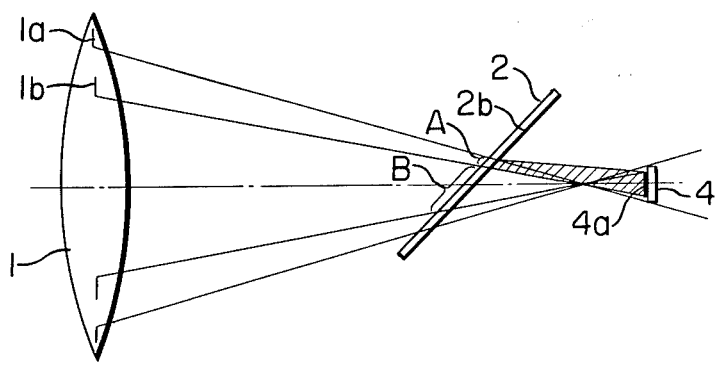
FIG. 3 illustrates the relation between the phenomenon of diffraction created by pin-holes and a light-receiving element.

On the other hand, the phenomenon of diffraction is not entirely eliminated by the above-described pin-holes 2a but occurs to a practically negligible extent. The relation between such phenomenon of diffraction and the light-receiving element will hereinafter be described by reference to FIG. 3. In FIG. 3, to facilitate the illustration, the metering small mirror 3 is omitted and the light path is shown to be developed on the optic axis of the picture-taking lens. Also, it is assumed that the exit pupil of the picture-taking lens 1 changes from 1a to 1b when the aperture is stopped down and that the light-receiving surface 4a of the light-receiving element 4 is of the shown size with respect to the exit pupil. First, non-diffracted light alone will be considered by reference to FIG. 3. The light from the small exit pupil 1b (for example, the exit pupil in a lens whose F-number is F/4) rectilinearly passes through the pin-holes 2a lying in the area B on the reflecting surface 2b and impinges on the light-receiving surface 4a. The light from the large exit pupil 1a (for example, the exit pupil in a lens whose F-number is F/2 or F/2.8) passes through the pin-holes 2a lying in the area A and B on the reflecting surface 2a, but only the light passed through the area B impinges on the light-receiving surface 4a. That is, in spite of the fact that the exit pupil is 1a, the quantity of light which impinges on the light-receiving surface 4a is almost unchanged with respect to the case where the exit pupil is 1b. This means that even if the size of the exit pupil is changed, the light-receiving element 4 cannot detect the change.

However, in the above-described embodiment, the phenomenon of light diffraction has occurred. Accordingly, the light from the large exit pupil 1a passes through the pin-holes 2a lying in the area A, whereafter part of such light is directed to the light-receiving surface 4a by the phenomenon of diffraction. The shaded portion shows the light path along which the light passed through the area A is directed to the light-receiving surface 4a by the phenomenon of diffraction. On the other hand, some of the light passed through the pin-holes in the area B does not reach the light-receiving surface 4a.

Figure 4:
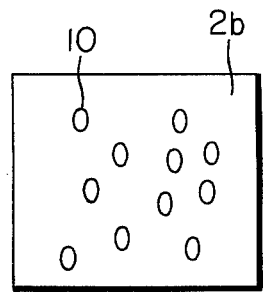
FIG. 4 is a front view of a reflecting mirror in which pin-holes of elliptical cross-section are formed.
Figure 5:
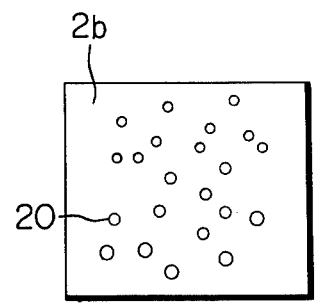
FIG. 5 is a front view of a reflecting mirror in which the size of the pin-holes is varied by the distance to a finder screen.

The light-receiving element 4 can detect a change in the size of the exit pupil by a difference in quantity of light received thereby and therefore, the output characteristic of the metering system with respect to the aperture of the picture-taking lens can be improved to a substantially linear state. The pin-holes 2a have so far been described with respect to the case where the cross-sectional shape thereof is circular. However, the cross-section of the pin-holes 2a may take any other shape. FIG. 4 is a front view of a reflecting mirror having pin-holes of elliptical cross-section. This is constructed so that the shadows of the pin-holes 10 in the direction of the optic axis of the picture-taking lens are circular, because the reflecting mirror 2 is provided so as to form an angle of 45° with the picture-taking optic axis. FIG. 5 shows a reflecting mirror in which the size of the pin-holes is varied by the distance of the pin-holes to the finder screen 5. That is, those of the pin-holes 20 which are near to the finder screen 5 are smaller in size and those of the pin-holes 20 which are distant from the finder screen 5 are larger in size. This has been done by taking it into account that if the pin-holes are of the same size, the influence of the shadows thereof upon the finder image is decreased as the pin-holed are more distant from the finder screen 5. Also, the reflection factor and transmittivity of the reflecting mirror can be readily selected by varying the ratio of the sum of the areas of the pin-holes 2a, 10, 20 to the area of the reflecting surface 2b. Further, the irregular arrangement of the pin-holes 2a, 10, 20 may be accomplished by determining the co-ordinates of the pin-holes on the reflecting surface 2b by the use of a table of random numbers. However, it is not desirable that the pin-holes overlap one another.

Thus, the device of the present invention can practically neglect the shadows of the pin-holes and can obtain a finder image in which the flare created by the phenomenon of diffraction is practically negligible and which is easy to view. It is also possible to improve the output characteristic of the metering system with respect to the aperture of the picture-taking lens by the phenomenon of light diffraction occurring to the pin-holes.

The device of the present invention does not employ the conventional translucent film which reduces the light passing through the reflecting mirror due to absorption, and therefore the metering performance can be improved.

I claim:

1. A reflecting mirror device in a single lens reflex camera for receiving light passed through the picture-taking lens of the camera during finder observation, said reflecting mirror device reflecting said light and directing it to a finder optical system such as a finder screen while, at the same time, passing therethrough part of said light and directing it to the light-receiving portion of a metering system, said reflecting mirror device having a number of pin-holes irregularly arranged on the reflecting surface thereof, each of said pin-holes having a cross sectional area of the order of $8 \times 10^{-5} - 8 \times 10^{-3}$ mm² whereby it is minute enough so that it is not recognized as a shadow in a finder image and large enough so that the phenomenon of light diffraction created by each pin-hole is not recognized as a flare in the finder image.

2. The device according to claim 1, wherein the cross-sectional shape of each of said pin-holes is circular and the diameter thereof is several hundredths of one millimeter.

3. The device according to claim 1, wherein each of said pin-holes is formed so that the shadow thereof in the direction of the optic axis of the picture-taking lens is circular.

4. The device according to claim 1, wherein the size of each of said pin-holes is determined as a function of the distance between respective pin-holes and the finder screen and is larger as the distance from said pin-hole to said finder screen increases.

5. The device according to claim 1, wherein said pin-holes are constructed so that the number and size thereof satisfy the desired transmittivity and reflection factor of said reflecting mirror device.

6. The device according to claim 1, wherein said pin-holes are also provided at a position whereat a diffracted light resulting from the light emergent from the marginal portion of an exit pupil of small F-number having passed through said pin-holes enters said metering system.

7. The device according to claim 6, wherein said F-number is no greater than F/2.8.

* * * * *